Figure 5:
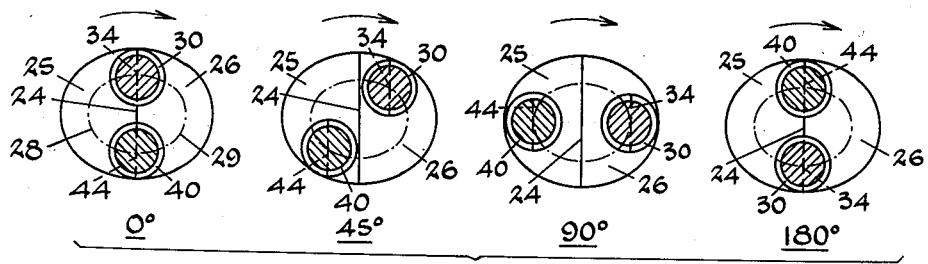

May 6, 1952  C. A. LATIMER  2,595,274
POWER TRANSMISSION
Filed June 13, 1946  2 SHEETS—SHEET 1
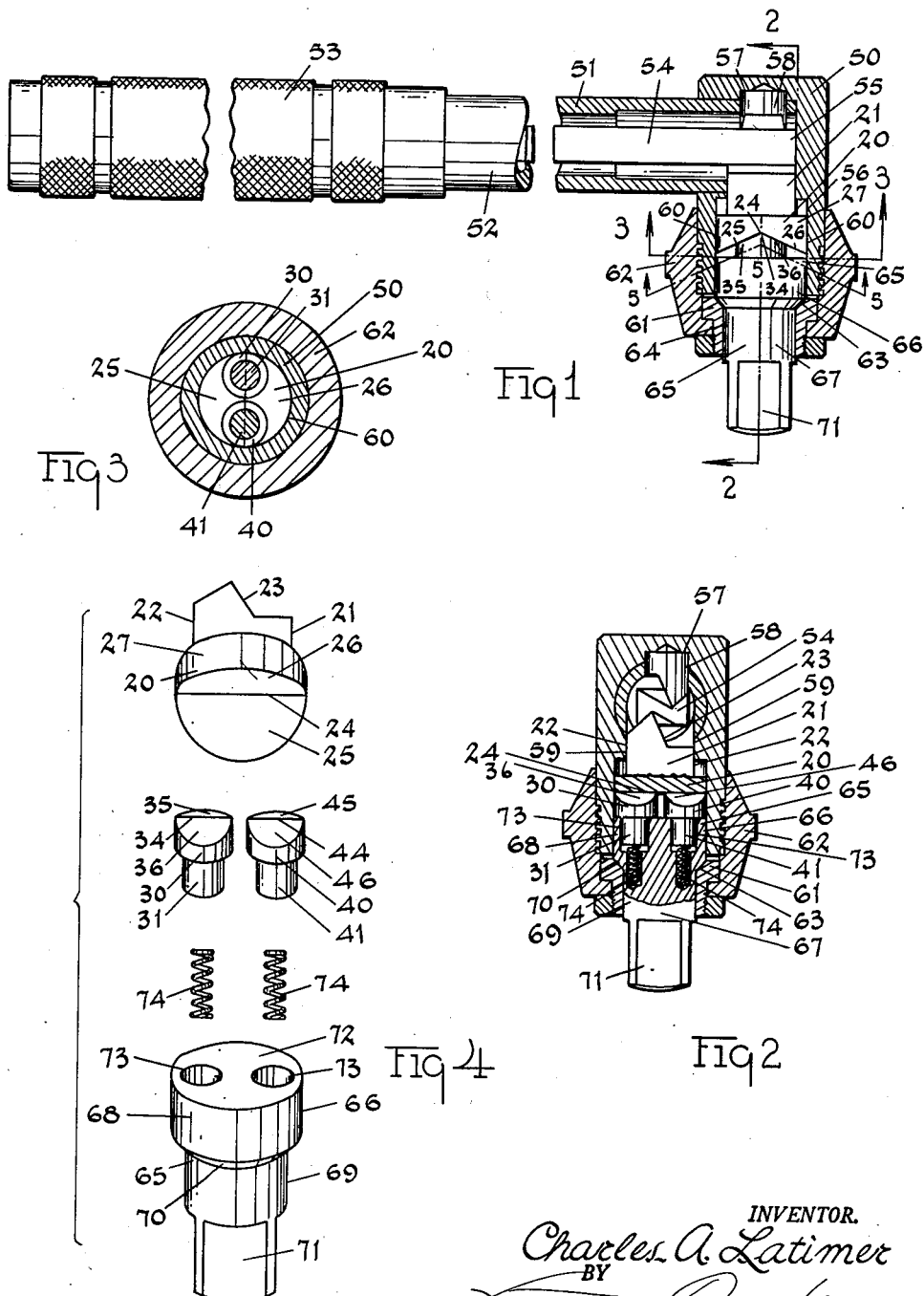
INVENTOR.
Charles A. Latimer
BY May 6, 1952

C. A. LATIMER 2,595,274

POWER TRANSMISSION

Filed June 13, 1946

2 SHEETS—SHEET 2

INVENTOR.
Charles A. Latimer
BY

Patented May 6, 1952

2,595,274

UNITED STATES PATENT OFFICE 2,595,274

POWER TRANSMISSION

Charles A. Latimer, Toledo, Ohio

Application June 13, 1946, Serial No. 676,454

16 Claims. (Cl. 64—29)

My invention relates to a power transmission of an exceedingly simple and efficient construction. Particularly, my invention relates to a construction in which power is transmitted by the movement of a driving member to a driven member through drive surfaces in mutual contact over an area of constant magnitude, through all phases of power transmitting movement of the members. My invention lends itself readily to the transmission and conversion of forces producing movement exerted on the driving member to produce a desired movement of the driven member.

My invention has for an object to utilize all the advantages of the cam or wobble plate transmissions, hereto known in the art, and to improve greatly upon such transmissions by remedying the acknowledged faults thereof.

The invention has for an object to provide drive members so related that, in the transmission of power, the operating or dynamic stress, in shear, exerted upon the drive members and their respective bearings is at a minimum and considerably less than that prevailing in prior art devices of like potentiality. Dynamic or operating stress, as used herein, refers to those forces which prevail in the movement of the drive members to and through the various momentarily occupied positions occurring in the relative movement of the members. These forces fluctuate as the members change in their relative positions and are increased by the friction existing between the drive surfaces of the drive members which resists relative change of member position. Since the change of relative member position in the power transmission of my invention is effected without rotatable movements of the contacting parts, relative to each other, the friction between the drive surfaces of the contacting parts is of a lesser order than in prior art devices in which the drive members rotate relative to each other, as well as moving translatorily through orbits. In this connection, the invention has for an object to provide a transmission in which power contact between the contacting parts is effected between two drive surfaces each identified for and contacting the other over a constant area, as distinct from certain of the prior art provisions of drive contact between a driving edge or a point contact with a drive surface or driving surface to surface contact over areas which vary in extent or identity with the movement of the drive members in the transmission of power.

Thus, in my invention, the stress forces, in shear, developed in the relative position of the members and changes therein are of a lower order than existing in transmissions of the prior art. Problems of computation of capacity, the provision of lubrication, the maintenance of optimum operational temperatures and the like, relative to the drive members of my invention, are reduced to simplicity.

My invention has for a particular object to provide a power transmission having driving and driven members, one provided with a plurality, preferably a pair, of plane drive surfaces, preferably of semi-elliptic outline and the other pivotally supporting an element having similar drive surfaces. Each drive surface on said member element extends in an inclined relation to the other drive surface on the member or element preferably to intersect along an edge line and form a dihedral angle conjugate to the dihedral angle of the drive surfaces of the other. The member and element are supported by a means in surface to surface contact over an area equal to that of one of the drive surfaces. A means is provided for moving the driving member relative to the driven member, while maintaining the specified drive surface contact of the members. When the preferred semi-elliptic outline of drive surface is utilized, my invention requires that the mentioned edge line of the dihedral angles formed by the drive surfaces shall coincide with the minor axis of such semi-elliptic drive surface. The rotatable movement of the member and element is characterized in my invention by occurring about axes which are parallel to and spaced from each other, each extending at right angles to the mentioned edge lines of the drive surfaces and each intersecting one of the same substantially at a medial point thereon. The axial or lineal movement of the members relative to each other is characterized, in my invention, by occurring along the axis of rotation, as above delineated. The translatory movement of the member and element relative to each other is characterized, in my invention, by occurring orbitally in a path which surrounds and is centered by one of the axes mentioned above. Preferably, the translatory movement occurs in a semi-elliptic path in the plane of one of the mentioned drive surfaces of one member, the minor axis of which semi-elliptic path substantially coincides with the edge line of surface intersection mentioned. The degree of movement of the members is dependent upon the characteristic movement of the driving member which is produced by the driving member moving means.

Another particular object of my invention is to provide a transmission having a plurality of elements on one of the driving and driven members. In this particularly preferred provision of my invention, the elements are symmetrically arranged and supported on a member. The axes of rotation and axial movement of the pair of elements relative to the supporting member extends in equispaced parallelism to the axis of rotation and axial movement of the supporting member. This arrangement makes for balanced and compensating application of forces as between the members in their various relative movements of power transmission and further reduces the stress in shear exerted on the members and transmission parts.

The invention has a further particular object to provide a power transmission readily applicable to pressure release or torque wrenches, which application is utilized hereinafter to illustrate particularly and describe an embodiment of my invention. Without substantial modification, however, the power transmission of my invention has ready applicability in the field of motors and generators of the spring, gravity, hydraulic, combustion, pneumatic and electrical types, and in the field of couplers, clutches and brakes for various machine elements and combinations.

The invention consists in other features and advantages which will appear from the following description and upon examination of the drawings. Structures containing the invention may partake of different forms and still embody the invention. To illustrate a practical application of the invention, I have selected a power transmission as an example of the various structures and details thereof that contain the invention and shall describe the selected structure hereinafter, it being understood that variations may be made without departing from the spirit of the invention. The particular structure selected is shown in the accompanying drawings and described hereinafter.

Figure 6:
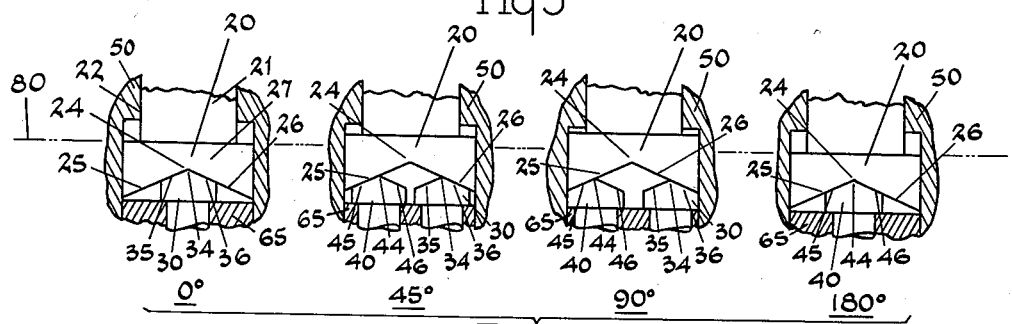
Figure 7:
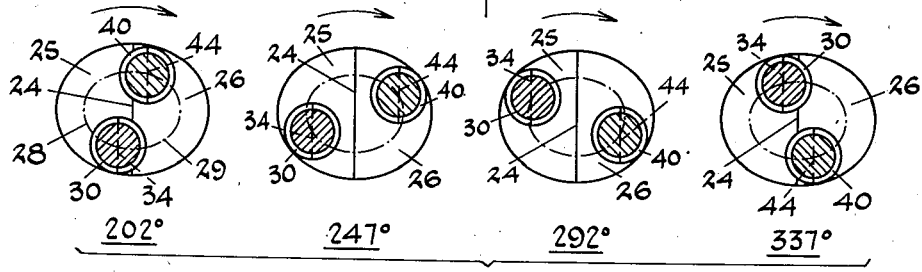
Figure 8:
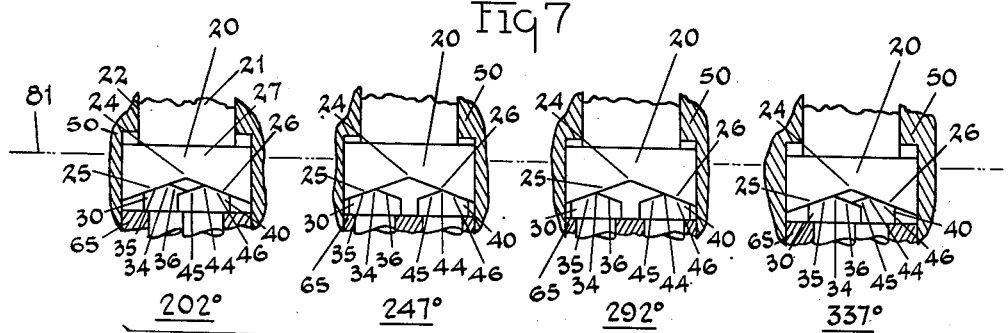

Fig. 1 of the accompanying drawings is a view of a power transmission embodying my invention, as incorporated in a torque wrench, portions of the wrench being shown broken away and in section to facilitate showing the power transmission parts. Fig. 2 is a view of a section taken along the plane of the line 2—2 indicated in Fig. 1. Fig. 3 is a view of a section taken along the plane of the line 3—3 indicated in Fig. 1. Fig. 4 is a view of the disassembled drive members and parts of the power transmission shown in Figs. 1 to 3. Fig. 5 is largely a diagrammatic view taken along the plane of the inclined lines 5—5—5 indicated in Fig. 1 of the drawings and shows, in plan and in progressive panels, the successive stages in the relative movement of the members in transmitting power. Fig. 6 is a companion view to Fig. 5 and shows diagrammatically, in corresponding progressive panels, the successive stage in the relative movement of the members when viewed from a point in elevation similar to the point of view utilized in Fig. 1. Fig. 7 is a diagrammatic view, in extension of the panel views of Fig. 5. Fig. 8 is a diagrammatic view and companion to Fig. 7 in extension of the panel views of Fig. 6.

Referring particularly to the drawings, the drive member is generally indicated at 20. In the particular construction shown in said drawings, and in certain phases of the operation thereof, the member 20 is the driving member. In other phases of operation, the roles of driving and driven are reversed.

The drive member 20 is shown disposed within and supported by supporting means, embodied in a head 50. The housing head 50 and its related handle 51 form, with the drive member and related parts, a torque release wrench 52 having many of the features of the Pressure Release Tool described in my copending application for Letters Patent Serial No. 514,374 filed December 15, 1943 and now abandoned. The handle 51 has a convenient gripping sleeve 53 by which the wrench may be manipulated and the head be rotated to drive the transmission. The handle is tubular in cross sectional outline and houses a spring motor means, embodied in a torque bar spring 54 disposed within the handle walls. One end of the bar spring 54, such as the end proximate to the gripping sleeve 53, is restrained from rotation about its longitudinal axis and the other end 55 is supported for rotation about such axis, constrained only as the resiliency of the bar spring 54 may exert counter pressure to such rotation. On distortion of the bar spring 54 by the relative rotation of its ends, the bar spring becomes charged with energy which tends to move the drive member 20 of the transmission. Those skilled in the art will be cognizant of the fact that the drive member 20 may be connected to any of a multiple of sources of energy, the particular manually operated head 50 and supplementary spring motor means embodied in the bar spring 54 fitting the purposes of illustration, as required by the statute.

The head 50 is orificed suitably to receive an end of the handle 51 and the end 55 of the bar spring 54, the handle and head being press-fitted and brazed to integrate structurally the two. The head 50 is cored to form a chamber 56 within the head having bearings and bearing seats for supporting the drive and driven members and the end 55 of the bar spring 54. As shown the head 50, in forming the chamber 56, is cored at its upper end, as viewed in Fig. 2, to provide a bearing seat 57 for a pillow bearing 58. The pillow bearing 58 engages, at its lower end, with a suitably conformed recess in the end 55 of the bar spring and resists forces in shear applied to such end from becoming effective but permitting rocking or rotatable movement of the bar spring end about the longitudinal axis of the bar spring.

The head 50, in forming the chamber 56, also is cored to form a plurality of slide bearings 59, which support the member 20 for slidable axial movement within the chamber 56. Preferably, the slide bearings 59 have plane surfaces and are formed in an inclined angular relation to each other to define a polyhedral space therebetween in and through which a part 21 of drive member 20 may move and be guided.

The part 21 of the drive member 20 is preferably formed integral with the other parts of the member and has surfaces 22 of the same polyhedral contour and spacial relation as the space between the slide bearings 59. The upper end of the part 21, as viewed in Fig. 2 of the drawings, is formed to provide a bearing 23 which engages with the end 55 of the bar spring 54. The relation of the bearing 23 to the bar spring end 55 is such as to allow rotation of the bar spring end and axial movement of the member 20, while maintaining the driving engagement between the bearing and bar spring end, as when the bar spring, in a distorted condition, tends to drive the member 20 in a downward direction or, conversely, when the upward axial movement of the member 20 tends to rotate and thus distort the bar spring 54.

The surfaces 22 of the member 20 in their sliding relation to the slide bearings 59 constrain the movement of the member 20 to purely axial movement or reciprocation. The axis of such axial or reciprocatory movement extends from a substantially medial point on and at right angles to an edge line 24 formed by the intersection of plane drive surfaces 25 and 26 of the member 20. The drive surfaces 25 and 26 are the power transmitting surfaces of the member 20 and are inclined to each other, preferably intersecting or vertexing along the edge line 24. The surfaces 25 and 26 are described as "plane" surfaces in the sense that they are flat and of uninterrupted continuity throughout their lateral expanse. The surfaces may be annular in peripheral outline relative to the axis of the member 20 but preferably are full as shown.

Preferably, the drive surfaces 25 and 26 are, also, semi-elliptic in outline with their minor elliptic axes coinciding with each other and with the edge line 24. Also, preferably the area of the drive surface 25 is equal to the area of the drive surface 26. The drive surfaces 25 and 26 in their angular relation define a dihedral angle. The angle of inclination of the drive surfaces may be varied to suit the exigencies of various transmission problems and to obtain variously desired strokes or amplitudes of action. The particular angle of inclination, i. e., 115°–125°, shown in the drawings is particularly favorable to the use of the transmission in the release wrench illustrated in the drawings.

The chamber 56 may be formed, within the head 50, to provide a supplementary slide cylindrical bearing 60 which engages the cylindrical lateral surface or cheek 27 of the member 20 to assist the slide bearings 59 in guiding the axial movement of the member 20.

The cylindrical bearing 60 also serves to support, for rotatable movement the drive member in which are mounted the elements 30 and 40. The open end of the chamber 56 may be closed by suitable bushings 61 and 62. The innermost bushing 61 is provided with a thrust bearing 63 and a slide and journal bearing 64 which, together with the slide bearing 60, operate to support and guide the driven member in its movement within the chamber 56. The bushing 61 is retained on the head and may be adjusted relative thereto by means of the bushing 62.

The particular driven member shown in the drawings is a stub shaft 65 of stepped diameters forming a cylindrical capital portion 66 and a cylindrical shank portion 67. The cylindrical lateral surface 68 of the capital portion 66 is dimensioned to be in journal and slide bearing relation with the bearing 60, and the cylindrical lateral face 69 of the shank portion 67 is dimensioned to have a journal and slide bearing relation with the bearing 64 of the bushing 61. The relation of the surfaces 68 and 69 to the bearings 60 and 64 is such as to support the shaft 65 for rotatable movement about and axial movement along an axis which is aligned with and coincides with a line projection of the axis of axial movement of the member 20, as above delineated.

The shaft 65 has an annular thrust bearing portion 70 which preferably, as shown, joins the lateral surfaces 68 and 69 thereof. The thrust bearing portion 70 is adapted to ride upon the thrust bearing 63 formed on the bushing 61. Hence, the shaft 65 is supported for both rotatable and axial movements relative to the head 60. In utilizing the power transmission disclosed herein in a wrench, it is desirable to provide the lower end of the shaft 65 with a boss 71 for connecting an adapter (not shown) into which the head of a bolt or a nut, to be driven, may be received.

The shaft 65 has, preferably, at its upper end, as viewed in Fig. 4 of the drawings, a plane base 72 of circular outline extending at right angles to the axis of rotation of the shaft 65. Extending inwardly from the base 72 are a plurality of recesses 73 of cylindrical contour whose axes extend parallel to and are spaced from the axis of rotation of the shaft 65. The recesses 73 form bearings of composite slide and journal type for the shanks 31 and 41 of the elements 30 and 40. The surface of the base 72 forms a thrust bearing for the elements 30 and 40.

The shanks 31 and 41 of the elements 30 and 40 are so dimensioned and cylindrically contoured as to fit nicely into the recesses 71 and be pivotally movable therethrough without binding or restraint. In the particular structure, it is also desirable to lodge small coiled springs 74 in each recess which tend to urge the shanks 31 and 41 outwardly from the recesses. The springs 74 are of but minor potentiality and, in keeping the elements 30 and 40 pressing against the member 20 with a light pressure, tend to prevent obnoxious rattling of the elements, as when the wrench is handled during non-working periods of use.

The shanks 31 and 41 are preferably integrated with other parts of their respective elements and in their sliding and journal relation to the recesses 73 constrain the elements to movements along or about certain axes. Each of such certain axes extends from a substantially medial point on and at right angles to an edge line 34 on the element 30 or the edge line 44 on the element 40. The edge line 34 is defined by the intersection of inclined plane drive surfaces 35 and 36 formed on the element 30 and the edge line 44 by the intersection of inclined plane drive surfaces 45 and 46 formed on the element 40. The surfaces 35 and 36 and the surfaces 45 and 46 are the power transmitting surfaces of the elements 30 and 40, respectively, one at least of each pair of which is adapted to be retained in surface contact with one of the surfaces 25 and 26 of the member 20, throughout all phases in the relative movement of the drive members. The area of surface contact between surfaces of each element 30 and 40 with the surfaces of the member 20 is of an area equal to that one of the surfaces 35 or 36 and 45 or 46. The surfaces 35 and 36 and 45 and 46, each being inclined to the other of each pair, form, in their angular relation, a dihedral angle. The dihedral angle formed by the surfaces 35 and 36 and the dihedral angle formed by the surfaces 45 and 46 are each individually conjugate to the dihedral angle formed by the surfaces 25 and 26 of the member 20. Since, in the particular construction shown in the drawings, the dihedral angle formed by the surfaces 25 and 26 of the member 20 is of the order of 115°–125°, the dihedral angle formed by each pair of the surfaces of each of the elements 30 and 40, being conjugate to the angle of the surfaces of the member 20, is of the magnitude of 245°–235°. The particular angular relation mentioned gives an approximate two to one mechanical ratio between the members 20 and 65 which varies as the members move relative to each other.

Preferably, the surfaces 35 and 36 and the surfaces 45 and 46 are each semi-elliptic in outline. The minor elliptic axes of each of the surfaces of each pair coincide and register with the respective edge lines 34 or 44, as the case may be. Also, preferably, the area of each of the surfaces 35, 36, 45 and 46 is equal. Thus, it will be observed that the forms of the member 20 and elements 30 and 40 are of such similarity and simplicity that each may be produced on automatic screw machine production facilities, notwithstanding which the assembled transmission will operate with considerable precision and efficiency in the transmission of power.

In such operation, the elements 30 and 40 start from the position shown in Fig. 1 of the accompanying drawings and in the leading left-hand diagrammatic sketch panel of each of the Figs. 5 and 6 of the drawings. This position, in the adaptation of transmission to the illustrated wrench, is called a rest position. Each element 30 and 40 has its respective surfaces 35 and 45 in surface contact with the surface 25 of the drive member 20 and their respective surfaces 36 and 46 in surface contact with the surface 26 of the member 20. This relation and identification of surface 25 with surfaces 35 and 45 and surface 26 with surfaces 36 and 46 is constant. In moving from the rest position to develop power transmitting torque, the elements 30 and 40, move with their respective surfaces 35 and 46 in surface contact with the surfaces 25 and 26 of the drive member 20, translatorily relative to the member 20 in an orbit about the axis of the member 20. The orbital path extends in the plane of each of the surfaces 25 and 26 of the member 20 and, when viewed in plan along such planes, is substantially of a semi-elliptic progression over the surfaces 25 and 26. The semi-elliptic path is indicated by the broken lines 28 and 29 on the surfaces 25 and 26, schematically shown to have a semi-elliptic outline in the diagrammatic panels of Figs. 5 and 7 of the accompanying drawings (though actually the head on which they are formed is truly cylindrical).

The translatory movement of the elements 30 and 40 relative to the member 20 and the head 50 and its connected bushings 61 and 62, causes the driven member 65 to rotate relative to the head or, upon resistance to rotation, causes the drive member 20 to move axially relative to the head. Of particular significance is the characteristic in my power transmission of the uniformly maintained surface engagement of the surfaces 25 and 35 and 26 and 46, through the phases of the relative movement of the members in such relative semi-elliptic translatory movement of the members 30 and 40 and axial movement of the member 20 illustrated in Figs. 5 and 6 of the drawings.

Hence, as will be observed in the second panel of each of the Figs. 5 and 6, the member 65 has rotated relative to the member 20 and head 50 to a position of 45°. One will note that elements 30 and 40 have initiated their movement through the orbital paths 28 and 29 over the surfaces 25 and 26 of the member 20 and that, with respect to the line of reference 80 indicated in Fig. 6, the drive member 20 and elements 30 and 40 have moved axially relative to each other. The relative axial movement continues until a 90° position of rotation of the member 65 relative to the elements is reached. This position is illustrated in the third panel of each of the Figs. 5 and 6 of the drawings.

In moving from the last mentioned 90° position to the 180° position shown in the fourth panel of each of the Figs. 5 and 6, the relative axial movement of the drive members is reversed to begin the return phase of reciprocation, but the continuity of the rotation of the member 65 and the translatory movement of the elements 30 and 40 relative to the member 20 is uninterrupted and progresses with smoothness. It will be further noted that although the elements 30 and 40 move rotatably relative to the member 65 in the course of entire 180° phase, they do not rotate relative to the member 20 maintaining a constant angular relation thereto and to the surfaces 25 and 26. Thus the only factor of friction existing between the surfaces is that incident to the lateral or orbital movement of the elements. The resistance to such orbital movement and stresses set up as a result of such resistance is greatly reduced. Further, at no stage in the relative movement of the members is there a period when an edge or point of one drive part engages or moves relative to a drive surface of another drive part. Hence, the drive surfaces are insured against cutting or scoring wear and will maintain fidelity throughout long periods of time. Also any wear of the drive surfaces 25, 35, 45, 26, 36 and 46 is of a compensating character and produces increased reliability in the movements of the members and elements.

In moving from the 90° position indicated in the third panels of Figs. 5 and 6 of the drawings to the 180° position, in the particular wrench construction disclosed herein, the motor means bar spring 54, having been distorted by 0° to 90° movements of the members, now exerts its energy through the bearing 23 to move the member 20 through a return phase of reciprocation and tends to drive the elements 30 and 40 through the second quadrant of their orbital path.

Assuming a continuation of the relative movement of the drive members from the position diagrammatically illustrated in the last or right hand panels of Figs. 5 and 6 of the drawings, the progression of the members and elements will be noted by examination of the left-most panels of Figs. 7 and 8. Figs. 7 and 8 are continuation companions of Figs. 5 and 6 respectively, and illustrate stages succeeding the last of the panels of Figs. 5 and 6. As the elements 30 and 40 leave the 180° of Figs. 5 and 6 and start to approach the 202° position indicated in Figs. 7 and 8, the surface 35 of element 30 disengages surface 25 of member 20 and surface 46 of element 40 disengages surface 26 of drive member 20. Coincidentally with such disengagement, surface 36 engages surface 26 of member 20 and surface 45 engages surface 25 of member 20. With the disengagement of the surfaces 35 and 46 from their formerly engaged surfaces of the member 20, opportunity is afforded for lubricating and cooling the surfaces 35 and 46, in anticipation of their subsequent engagement of the drive surfaces of member 20 upon repetition of the stroke sequentially illustrated in Figs. 5 and 6. So, also may the surfaces 36 and 45 be similarly treated during the period of the stroke illustrated in Figs. 5 and 6.

The elements 30 and 40 progress through the orbital paths 28 and 29 from the 202° position to and through the successive 247°, 292° and 337° positions to complete the cycle at the rest or 0° position shown in the left-most panels of Figs. 5 and 6. The axial movement of the members and elements relative to each other is shown in Fig. 8 by the reference line 81, which is a projection of line 80 of Fig. 6. The orbital path of element 30 through the stages illustrated in Figs. 7 and 8 is the same path 28 traveled by the element 40 in the stages illustrated in Figs. 5 and 6. The same is true of the path 29 of the element 40 through the stages of Figs. 7 and 8.

One skilled in the art will be at once cognizant of the advantages which reside in the symmetrical arrangement of the member 20 and elements 30 and 40. Viewing the panels of Figs. 5, 6, 7 and 8 particularly the 90° and 290° positions, it will be recognized that although the member and elements are in positions of greatest working thrust, there will be no stress in shear on the member 65 or on the member 20 which is transmitted to their respective bearings. This constitutes a marked step forward over the well known wobble plate transmission of the prior art.

In the particular wrench 52 shown, the handle 51 is moved angularly about an axis coinciding with that of a bolt head or nut disposed within the adapter supported on the boss 71. As long as the resistance to rotation exerted by bolt head or nut is less than certain magnitude, members 20 and 65 and elements 30 and 40 rotate as one, with the head 50. When, however, the resistance to rotation exerted by such engaged bolt or nut becomes greater than such certain magnitude and the handle is continued in its angular movement, the drive member 20 rotates with the head 50 relative to the member 65, and the elements 30 and 40, in their translatory movement, relative to the drive member 20, over the surfaces 25 and 26, cause axial movement of the drive member 20, distorting the torque bar spring 54. By varying the resistance of the bar spring 54 or by adjusting the relative positions of the drive member 20, member 65 and end 55 of torque bar spring with respect to each other, various adjustments of the capability of the wrench to rotate the engaged bolt head or nut against resistances of various magnitudes may be effected. In the performance of the various functions in the wrench illustrated, the member 65 may be regarded as driving the member 20 against the resistance of the bar spring 54. As the spring 54 operates to drive the member 20 in its return stroke, the drive member 20 may be regarded as driving the member 65.

As the transmission is adapted to various fields of use, parts, such as the member 65, may be utilized to perform multiple functions beyond that of supporting the elements 30 and 40 and connecting a bolt head or nut to the transmission. It may be connected to various energy producing machines and the driven of the members perform various functions, all of which becomes readily apparent to those skilled in the art. While I have illustrated and described the best form of my invention now known to me, as required by the statutes, those skilled in the art will readily understand that changes may be made in the disclosed construction, without departing from the spirit of my invention as set forth in the appended claims.

I claim:

1. A power transmission having a housing, a driving member and a driven member in said housing, one of said members being mounted in the housing for lineal non-rotative movement relative to the housing, the other of said members being mounted in the housing for rotation relative to said housing, an element in the housing having angularly related surfaces, one of said members having angularly related surfaces conjugate to the first mentioned surfaces, the other of said members pivotally mounting said element for rotation about an axis parallel to the axis of rotation of the member mounted for rotation, and means constraining the member and element surfaces into engagement with each other.

2. A power transmission as claimed in claim 1 in which the number of angularly related surfaces on each of the member and element is two.

3. A power transmission as claimed in claim 2 in which the angularly related surfaces of the member are each of different area than the angularly related surfaces on the element.

4. A power transmission as claimed in claim 1 in which the member mounted for lineal movement is the member having the angularly related surfaces.

5. A power transmission as claimed in claim 1 having in addition thereto means connected to the housing for rotating the housing about the axis of rotation of the member mounted for rotation.

6. A power transmission as claimed in claim 1 in which the means for constraining the member and element surfaces into engagement with each other includes a bearing engaging one of the members.

7. A power transmission as claimed in claim 1 in which the means for constraining the member and element surfaces into engagement with each other includes a bearing mounted on and separate from the housing and engaging the member mounted for rotation.

8. A power transmission as claimed in claim 7 having in addition thereto means engaging said bearing and housing to support the bearing on the housing in adjusted positions.

9. A power transmission as claimed in claim 1 in which said constraining means includes a resilient part engaged by the lineally movable member.

10. A power transmission as claimed in claim 9 having in addition thereto a means engaging the resilient part to distort the resilient part and retain the part so distorted.

11. A power transmission as claimed in claim 1 having in addition thereto means limiting the lineal movement of the member supported for lineal movement and cooperating with said constraining means after the lineally movable member has moved lineally a limited amount.

12. A power transmission having a housing, a hollow handle connected to the housing, a driving member and a driven member in the housing, a slide bearing in the housing for supporting one of the members for lineal non-rotative movement relative to the housing, a shoulder at one end of the slide bearing limiting the lineal movement of the member supported by the bearing, a spring in the handle having one end thereof connected to the handle and the other end extending into the housing, said other end of the spring engaging the member supported for lineal movement, an annular bearing on the housing and movable relative thereto for supporting the other member for rotation relative to the housing, adjustment means engaging the annular bearing and housing operable to hold the annular bearing at any one of the number of different positions on the housing, a plurality of elements in the housing having angularly related pairs of surfaces, the member supported for lineal movement having a pair of angularly related surfaces conjugate to each pair of surfaces on each element, the member supported for rotation pivotally mounting said elements for rotation about axes parallel to and equally spaced from the axis of rotation of the member supporting the elements.

13. A power transmission having a housing, a pair of members in the housing, the members mounted for relative rotative and lineal movement in said housing, an element in said housing having angularly related surfaces, one of said members having angularly related surfaces conjugate to the first mentioned surfaces, the other of said members pivotally mounting said element for rotation about an axis parallel to the axis of relative rotation of the members and means constraining the member and element surfaces into engagement with each other.

14. A power transmission having a housing, a driving member in said housing and a driven member in said housing, one of said members being mounted in the housing for lineal and non-rotative movement relative to the housing, the other of said members being mounted in the housing for rotation relative to said housing, a plurality of elements in the housing having angularly related surfaces, one of said members having angularly related surfaces conjugate to the first mentioned surfaces, the other of said members pivotally mounting said elements for rotation about axes parallel to the axis of rotation of the member mounted for rotation, and means constraining the member and element surfaces into engagement with each other.

15. A power transmission as claimed in claim 14 in which the axes of rotation of the elements are spaced the same distance from the axis of rotation of the member pivotally supporting the elements.

16. A power transmission as claimed in claim 15 in which said axes of rotation of the elements are on diametrically opposite sides of the axis of rotation of the member supporting the elements.

CHARLES A. LATIMER.

REFERENCES CITED

The following references are of record in the file of this patent:

UNITED STATES PATENTS

| Number | Name | Date |
| --- | --- | --- |
| 2,332,971 | Johnson | Oct. 26, 1943 |
| 2,409,545 | Cornwell | Oct. 15, 1946 |